United States Patent
Huang

(10) Patent No.: US 8,317,068 B2
(45) Date of Patent: Nov. 27, 2012

(54) BICYCLE CARRIER RACK

(75) Inventor: Ching-Shu Huang, Tainan (TW)

(73) Assignee: Hern Juei Co., Ltd., Tainan (TW)

( * ) Notice: Subject to any disclaimer, the term of this patent is extended or adjusted under 35 U.S.C. 154(b) by 355 days.

(21) Appl. No.: 12/829,789

(22) Filed: Jul. 2, 2010

(65) Prior Publication Data

US 2012/0000953 A1 Jan. 5, 2012

(51) Int. Cl.
*B60R 9/06* (2006.01)
*B60R 9/10* (2006.01)

(52) U.S. Cl. ........ 224/505; 224/497; 224/502; 224/519; 224/532; 224/924

(58) Field of Classification Search .................. 224/497, 224/501–510, 518–521, 531–532, 924; 211/17–22; 403/113, 119
See application file for complete search history.

(56) References Cited

U.S. PATENT DOCUMENTS

| 6,123,498 | A | * | 9/2000 | Surkin .......................... 414/462 |
| D608,723 | S | | 1/2010 | Flaherty et al. |
| 2009/0120986 | A1 | * | 5/2009 | Sautter et al. .................. 224/497 |

* cited by examiner

*Primary Examiner* — Justin Larson
*Assistant Examiner* — Adam Waggenspack
(74) *Attorney, Agent, or Firm* — J.C. Patents

(57) ABSTRACT

The bicycle carrier rack includes a main frame, a swaying frame and an adjustment device. The main frame stands vertically, combined with the swaying frame by the adjustment device. Fixed at the bottom portion of the main frame is a positioning rack to connect with a vehicle or a trailer. Two positioning holes are bored in the main frame. The swaying frame is combined with the main frame by the adjustment device, having a positioning member and a positioning projection employed to primarily position with positioning holes of the main frame. The adjustment device has a shell, and a movable element installed in the shell to co-work with the positioning member of the swaying frame. With a starting element to control the movable element, the adjustment device can work to alter the combined status of the main frame and the swaying frame, enabling the bicycle carrier rack unfolded or folded.

16 Claims, 9 Drawing Sheets

BICYCLE CARRIER RACK

BACKGROUND OF THE INVENTION

1. Field of the Invention

This invention relates to a bicycle carrier rack, particularly to one utilizing a starting element of an adjustment device to enable a movable member to move up and down to quickly adjust the included angle between a main frame and a swaying frame, so that the bicycle carrier rack can be conveniently unfolded or folded up.

2. Description of the Prior Art

A conventional bicycle carrier rack, as disclosed in U.S. Pat. No. D608723S, is fixed on an extending rack of a vehicle, using a movable joint to combine and alter the combination of a main frame and a movable frame. However, the conventional bicycle carrier rack looks coarse and unaesthetic. Moreover, a user may be hurt if incautiously operating the movable joint.

SUMMARY OF THE INVENTION

The object of this invention is to offer a bicycle carrier rack, which is fixed on a vehicle or the like, able to make a main frame and a swaying frame quickly unfolded or folded according to a user's need.

The main characteristics of the invention are a main frame, a swaying frame and an adjustment device. The main frame is fixed with a vehicle or the like. By simply operating the adjustment device, the main frame can be differently combined with the swaying frame. It is to be noted that when the swaying frame is swung to have a preset included angle with the main frame, the adjustment device can automatically combine with the swaying frame to make the bicycle carrier rack unfolded or folded.

BRIEF DESCRIPTION OF DRAWINGS

This invention is better understood by referring to the accompanying drawings, wherein.

DETAILED DESCRIPTION OF THE PREFERRED EMBODIMENT

Figure 1:
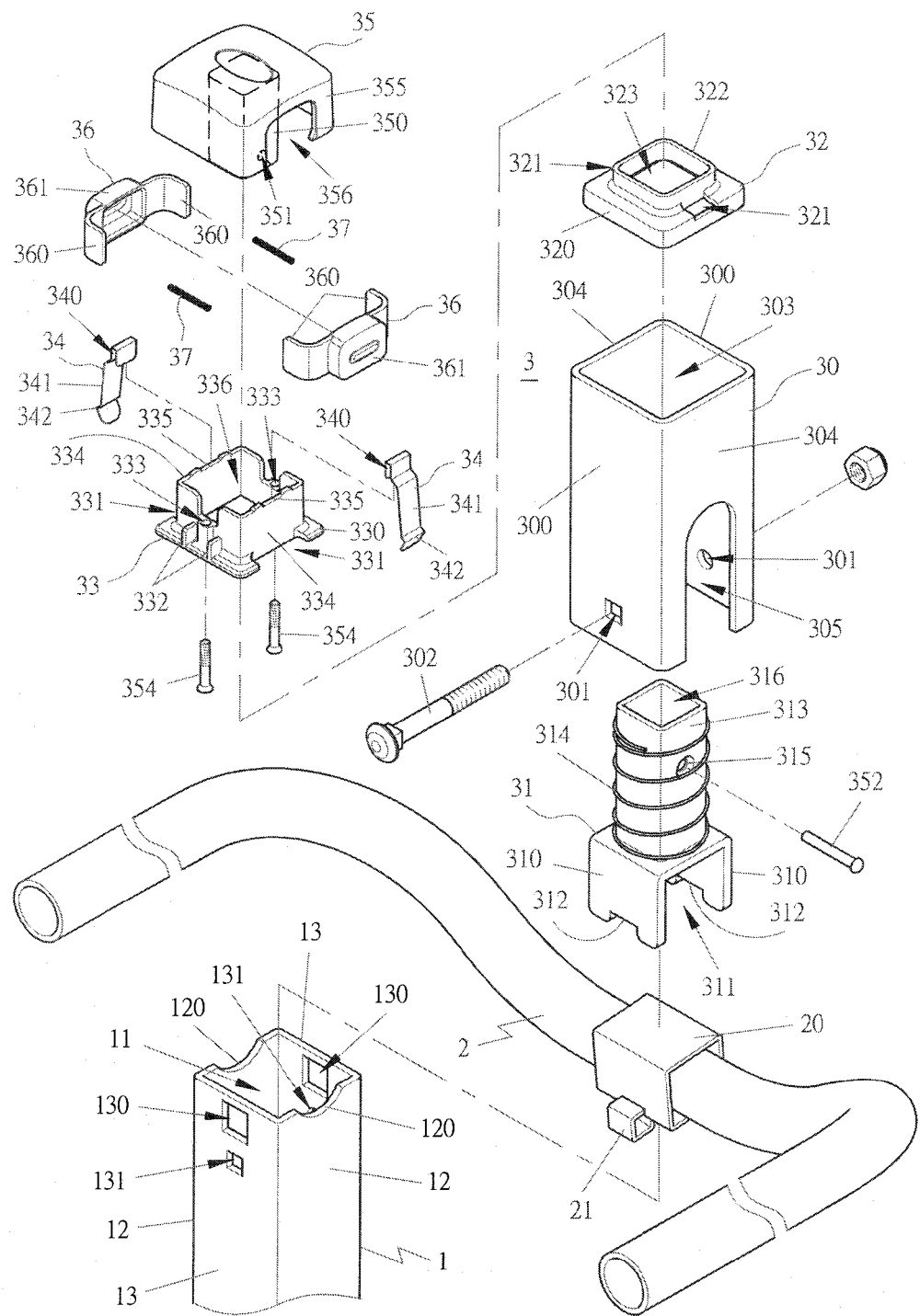
FIG. 1 is an exploded perspective view of a preferred embodiment of a bicycle carrier rack in the present invention.
Figure 2:
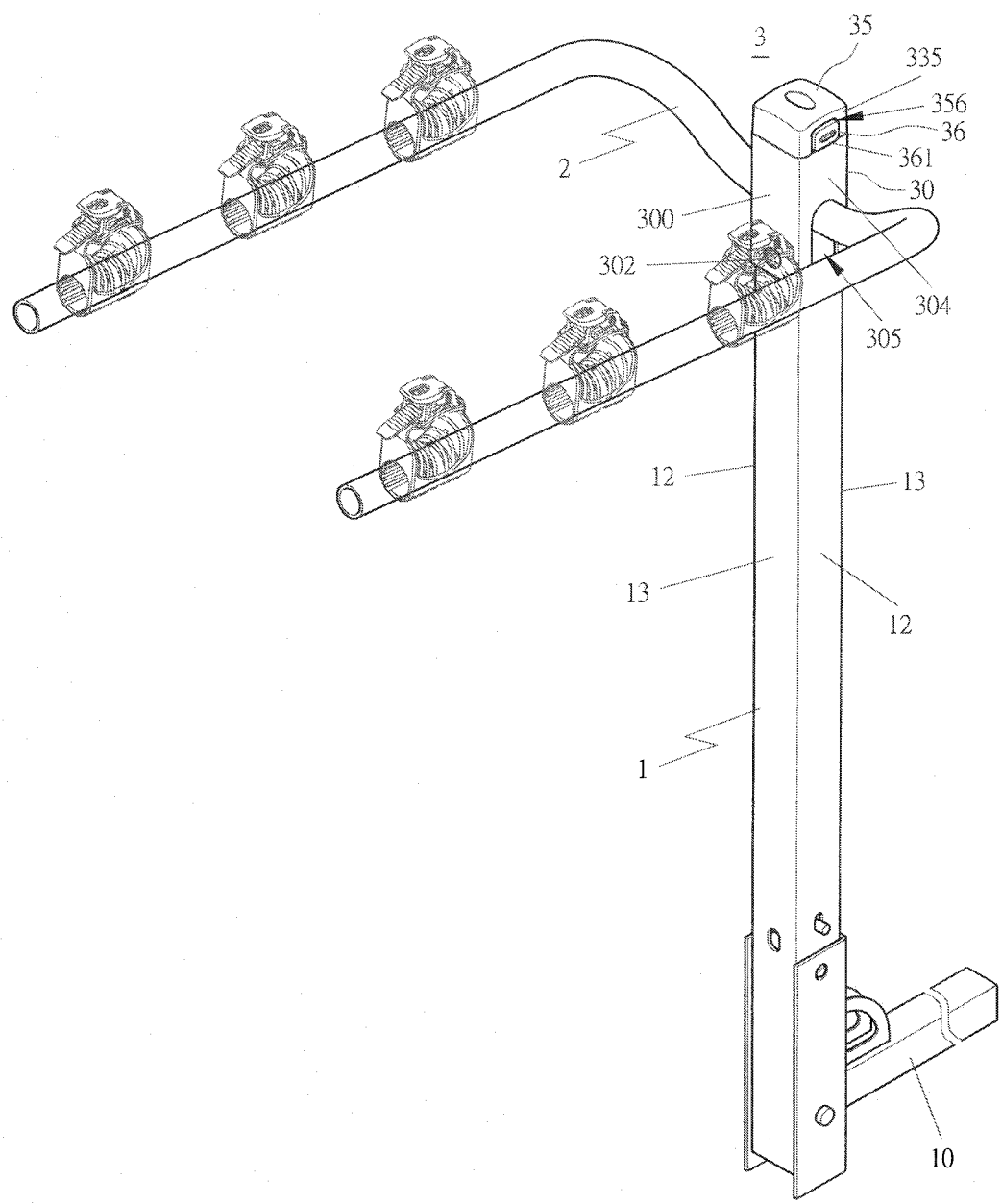
FIG. 2 is a perspective view of the preferred embodiment of a bicycle carrier rack in the present invention, showing it being unfolded completely.
Figure 3:
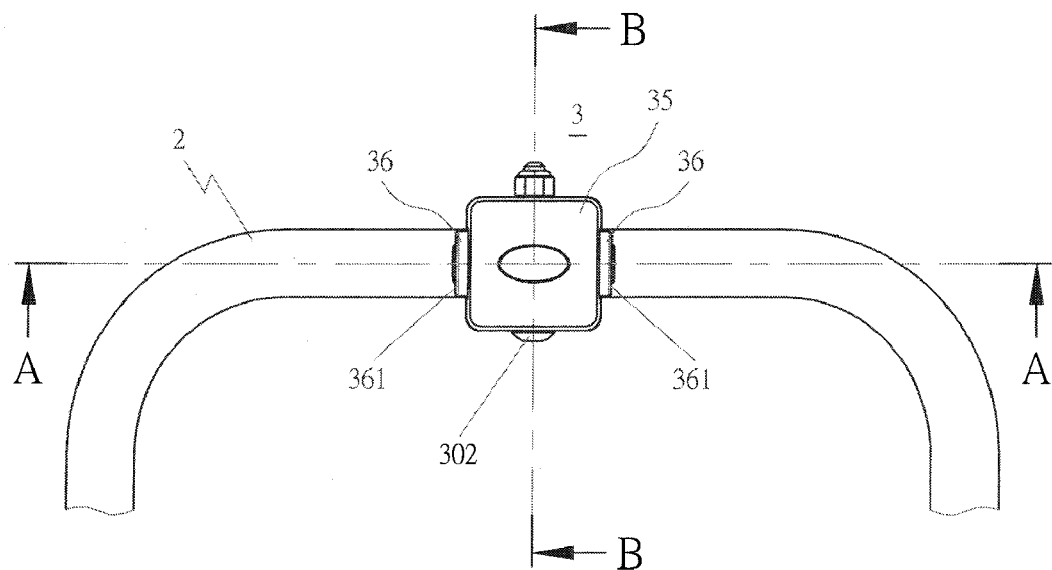
FIG. 3 is a partial top view of the preferred embodiment of a bicycle carrier rack in the present invention, showing it being unfolded.
Figure 4:
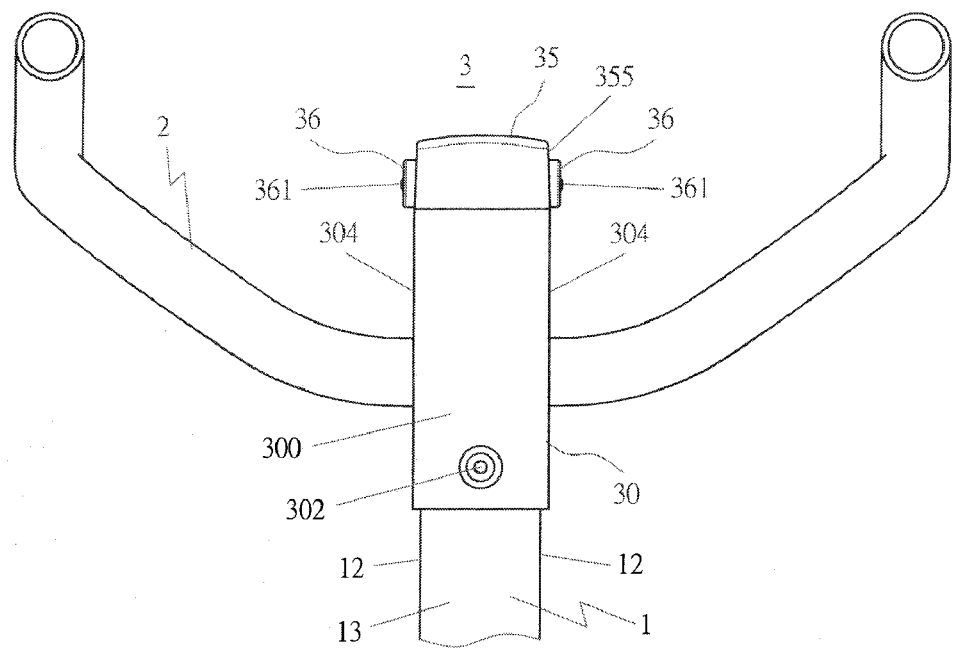
FIG. 4 is a partial side view of the preferred embodiment of a bicycle carrier rack in the present invention, showing it being unfolded.

As shown in FIGS. 1-4, a preferred embodiment of a bicycle carrier rack in the present invention consists of a main frame 1, a swaying frame 2 and an adjustment device 3.

The main frame 1 stands vertically, combined with the swaying frame 2 by means of the adjustment device 3. Fixed at the bottom portion of the main frame is a positioning rack 10 used to connect with a vehicle or a trailer.

The main frame 1 is made of a square tube or other geometric ones, provided with a central hole 11. The main frame 1 has two sidewalls 12 respectively formed with a recess 120 at the top for the swaying frame 2 to mount on, and a front and a rear wall 13 respectively bored with a positioning hole 130 formed as a square or other geometric shapes. The front and the rear wall 13 respectively have a bolt hole 131 shaped differently.

Figure 7:
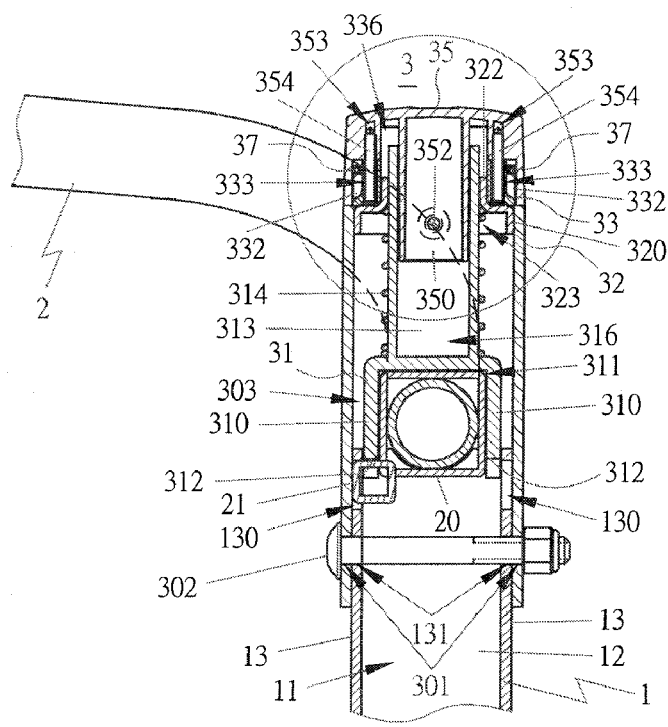
FIG. 7 is a cross-sectional view of the "B-B" line in FIG. 3.
Figure 11:
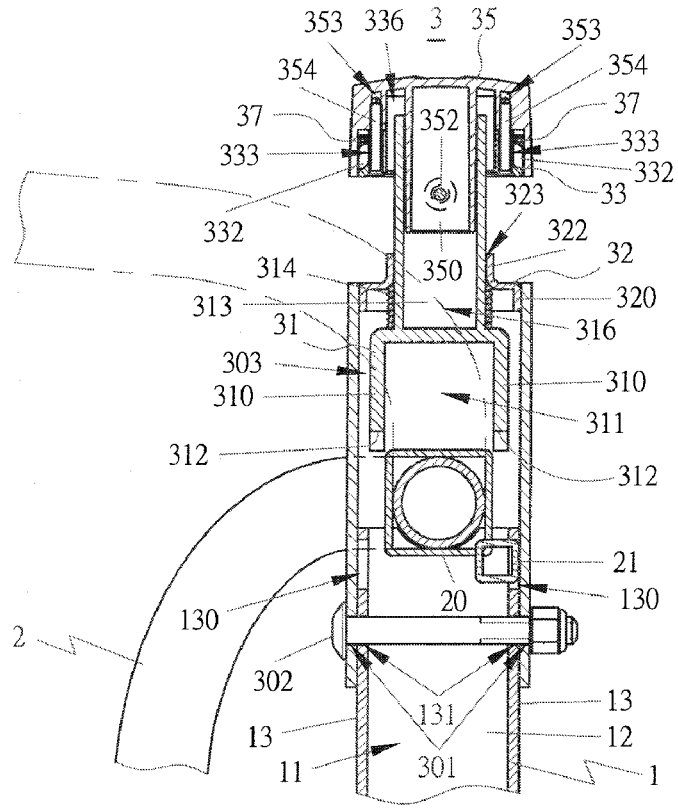
FIG. 11 is a cross-sectional view of the preferred embodiment of a bicycle carrier rack in the present invention, showing a third operation stage while folding the bicycle carrier rack.

The swaying frame 2 is combined with the main frame 1 by means of the adjustment device 3. The swaying frame 2 possesses a positioning member 20 preferably shaped to match with the central hole 11 of the main frame 1, and a positioning projection 21 having a width smaller than that of the positioning member 20 and protruded out of one side of the positioning member 20. As shown in FIG. 7 or 11, when the positioning member 20 is combined in the central hole 11 of the main frame 1, the positioning projection 21 can engage with the positioning hole 130 of the main frame 1 temporarily, enabling the main frame 1 and the swaying frame 2 to achieve a primary positioning stage.

The adjustment device 3 is composed of a shell 30, a movable member 31, a sealing member 32, a base 33, two flexible fasteners 34, a cap 35 and two buttons 36.

Figure 5:
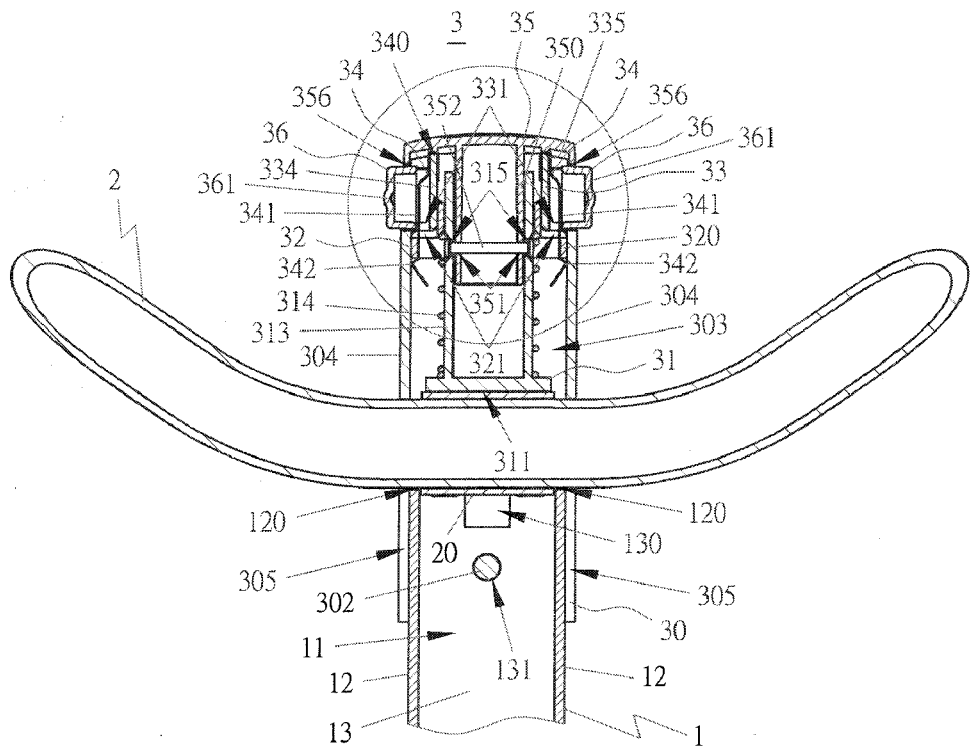
FIG. 5 is a cross-sectional view of the "A-A" line in FIG. 3.
Figure 9:
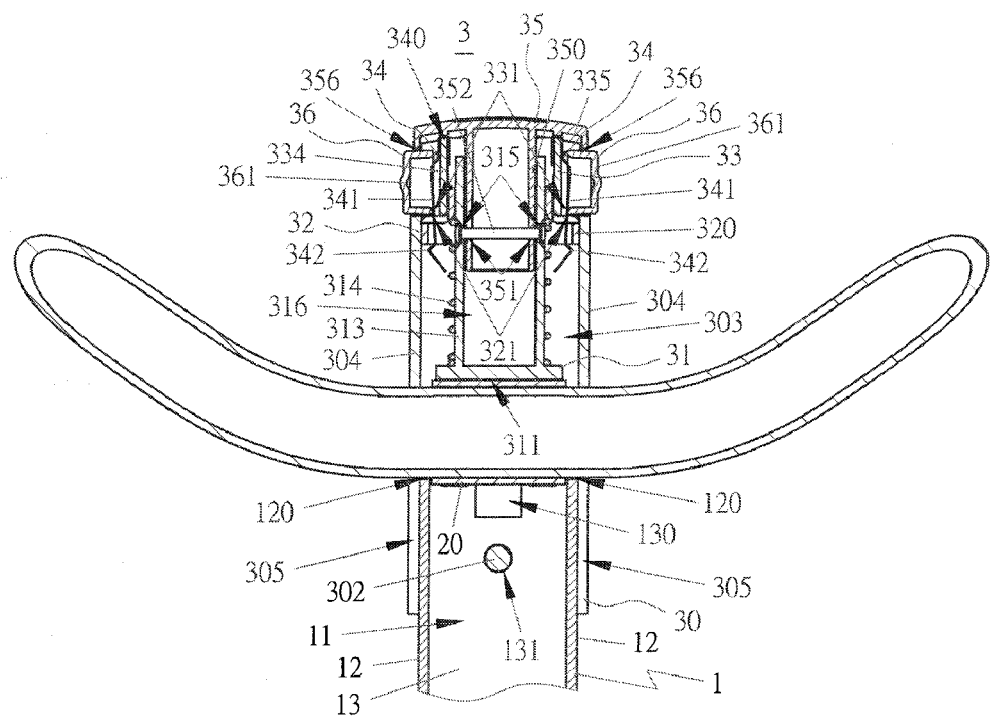
FIG. 9 is a perspective view of the preferred embodiment of a bicycle carrier rack in the present invention, showing a first operation stage while folding the bicycle carrier rack.
Figure 10:
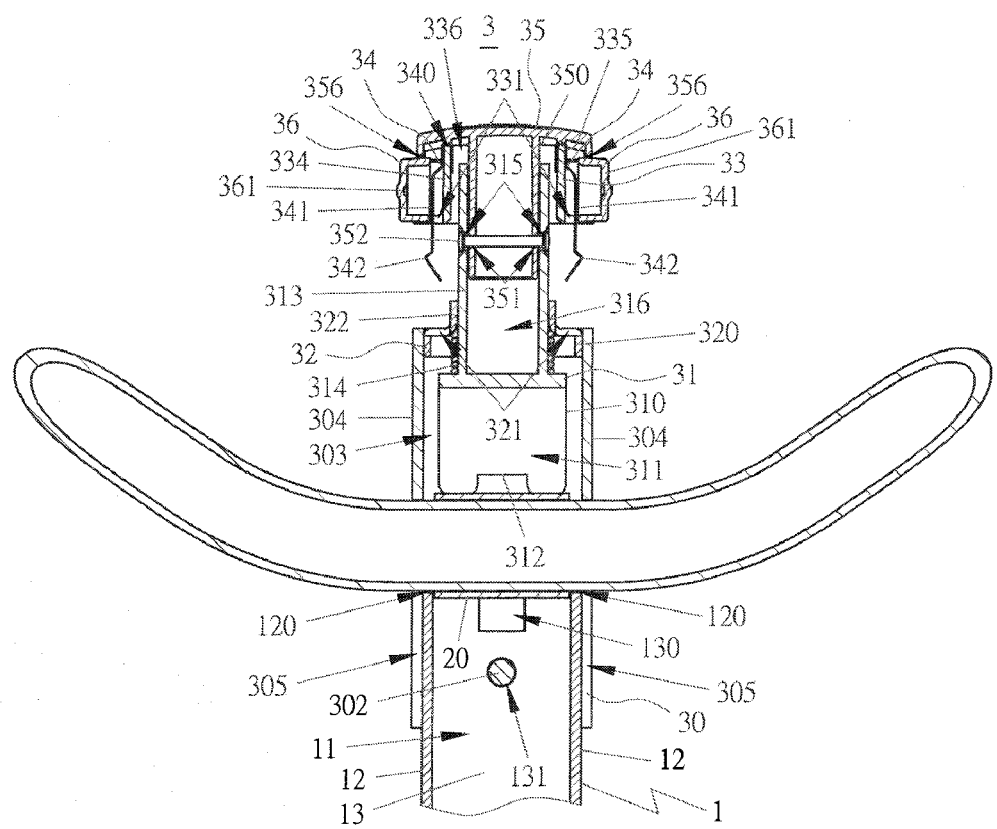
FIG. 10 is a cross-sectional view of the preferred embodiment of a bicycle carrier rack in the present invention, showing a second operation stage while folding the bicycle carrier rack.

The shell 30 includes a front wall 300 and a rear wall 300 respectively bored with a bolt hole 301 having a different shape to match with those of a bolt 302 and the bolt hole 131 of the main frame 1. With the bolt 302 successively inserted through the bolt hole 301 of the front wall 300, the bolt hole 131 of the main frame 1, and the bolt hole 301 of the rear wall 300, the shell 30 can be completely combined with the main frame 1 without any possibility to turn around. In addition, the shell 30 has a central hole 303 formed square or other geometric ones, and two sidewalls 304 respectively having an arched groove 305 formed in the lower portion to fit the arms of the swaying frame 2 and to loosely wrap up the positioning member 20 of the swaying frame 2, as shown in FIGS. 5, 7 and 9.

The sealing member 32 is fixed near the interior top of the central hole 304 of the shell 30, provided with a lower sideward-extending portion 320, a side hole 321 bored in two corresponding sides of the lower sideward-extending portion 320 respectively, an upper upward-extending portion 322 and a central hole 323.

Figure 6:
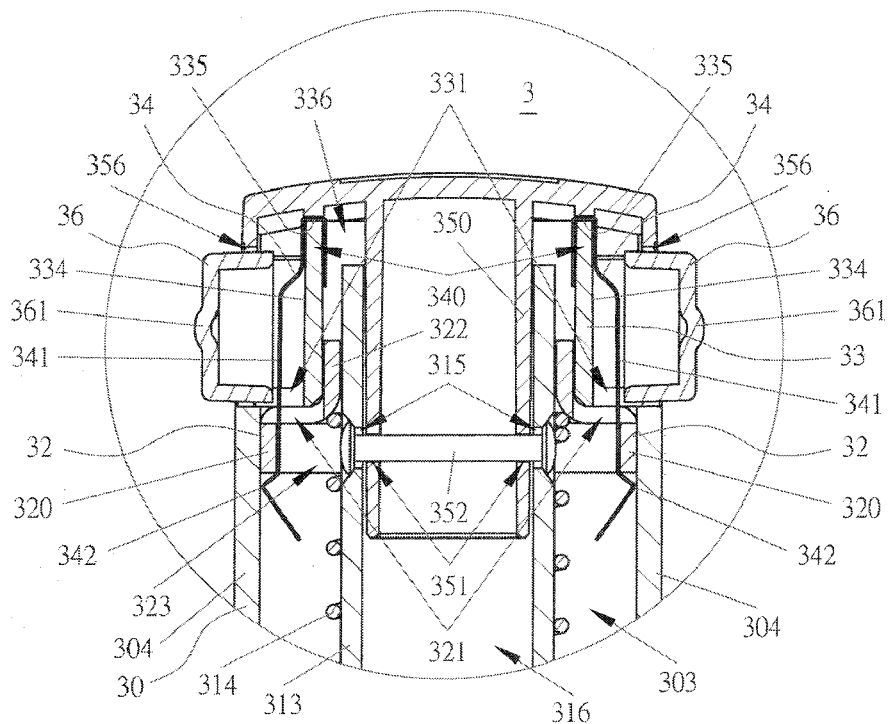
FIG. 6 is a partial magnified view of FIG. 5.
Figure 12:
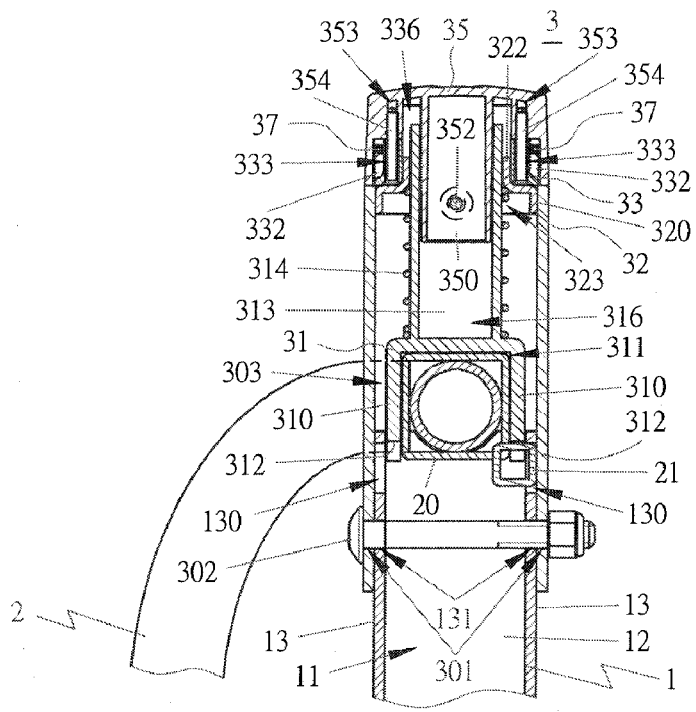
FIG. 12 is a cross-sectional view of the preferred embodiment of a bicycle carrier rack in the present invention, showing a fourth operation stage while folding the bicycle carrier rack.
Figure 13:
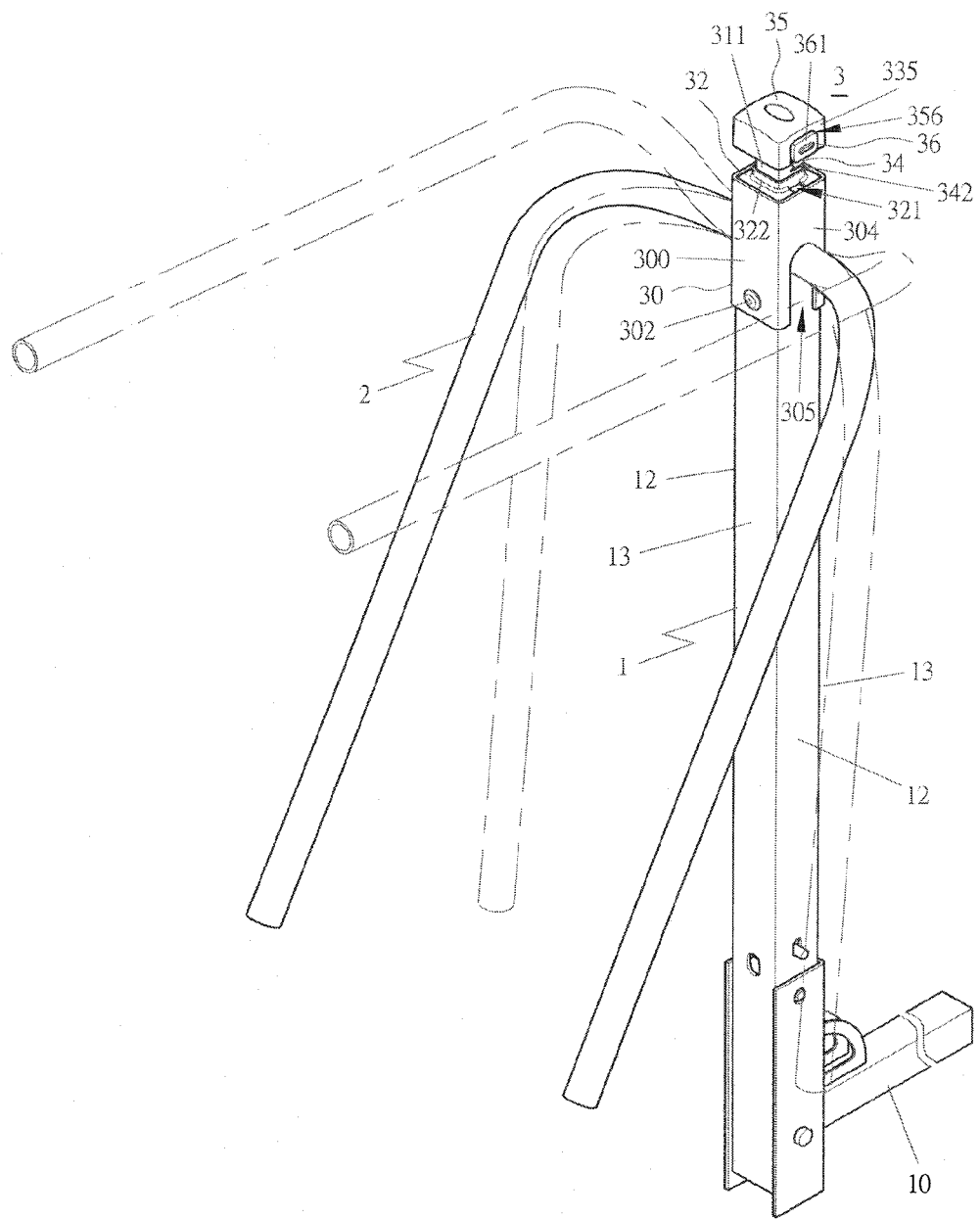
FIG. 13 is a perspective view of the preferred embodiment of a bicycle carrier rack in the present invention, showing the process of folding the bicycle carrier rack.
Figure 14:
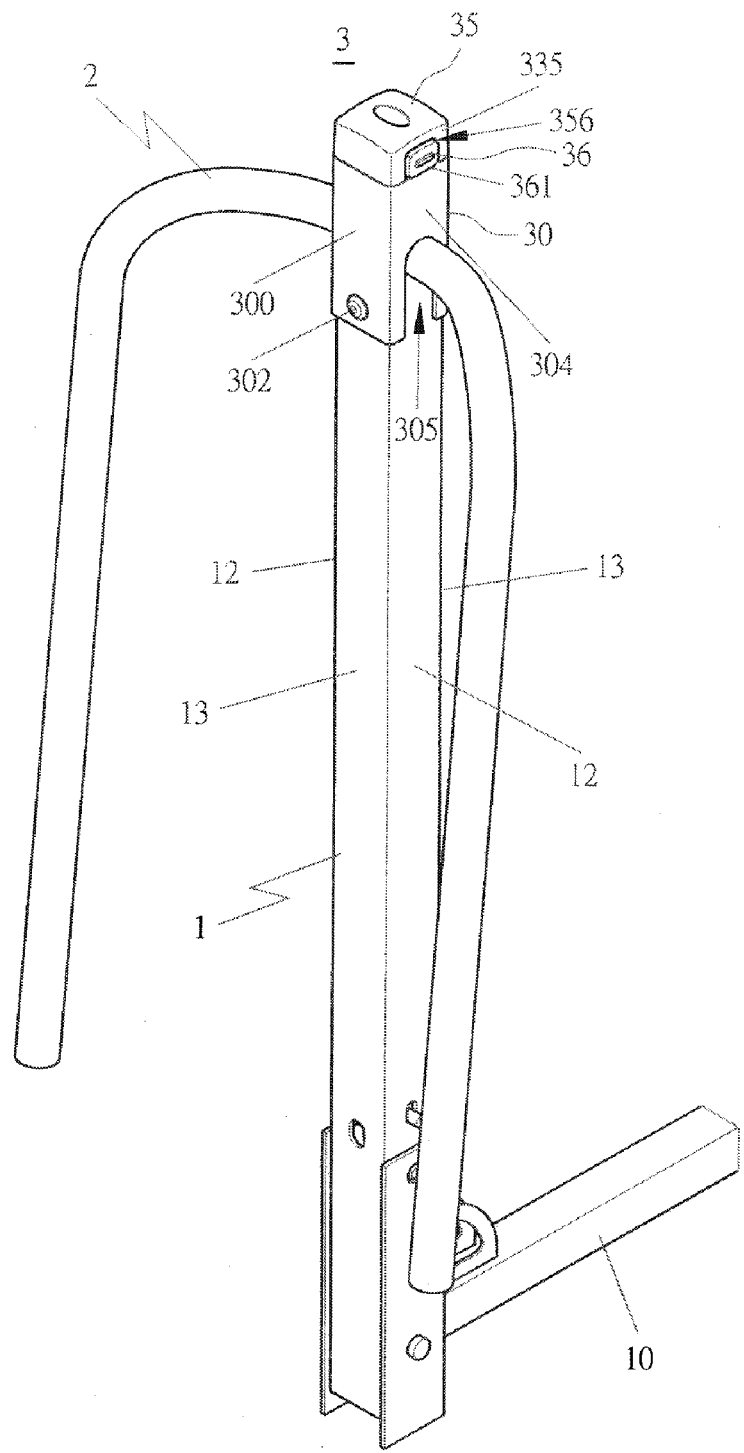
FIG. 14 is a perspective view of the preferred embodiment of a bicycle carrier rack in the present invention, showing it being folded up completely.

As shown in FIGS. 1 and 5~8, the movable member 31 has a front wall and a rear wall 310. A space 311 is defined between the front wall and the rear wall 310 for accommodating the positioning member 20 of the swaying frame 2, with the front wall 310 and the rear wall 310 of the movable member 31 attached with the front wall and the rear wall of the positioning member 20 of the swaying frame 2, as shown in FIGS. 7 and 12. Each of the front wall 310 and the rear wall 310 of the movable member 31 has a notch 312 formed at the bottom to enable the positioning projection 21 of the positioning member 20 of the swaying member 2 to work freely, as shown in FIGS. 7 and 12. The upper portion of the movable member 31 is formed with a tubular member 313, which is wrapped by a compression spring 314, with the top of the spring 314 leaning against the bottom of the sealing member 32, as shown in FIG. 6. The tubular member 313 has a rivet hole 315 to be inserted by a rivet 352 to joint the cap 35 of a starting element. And the tubular member 313 has a central hole 316.

As shown in FIGS. 1 and 5~8, the base 33 of the starting element of the adjustment device 3 includes a lower sideward-extending portion 330, a groove 331 formed at two sides of the lower sideward-extending portion 330 respectively, two upward projections 332 formed at a front wall and a rear wall of the lower sideward-extending portion 330 respectively, and a bolt hole 333 bored between the two upward projections 332. The base 33 also includes an upper upward-extending portion 334, a recess 335 formed at two sides of the upper upward-extending portion 334 respectively, and a central hole 336.

As shown in FIGS. 1 and 5~8, the flexible fastener 34 of the initiating element of the adjustment device 3 has an engaging groove 340 provided to fix with the recess 335 of the base 33, a downward extending portion 341 and a projected portion 342 formed at the bottom of the downward extending portion 341. The downward extending portion 341 is to be fitted in the groove 331 of the base 33 and inserted through the side hole 321 of the sealing member 32, with the projected portion 342 leaning against the interior bottom of the lower sideward-extending portion 320 of the sealing member 32.

Figure 8:
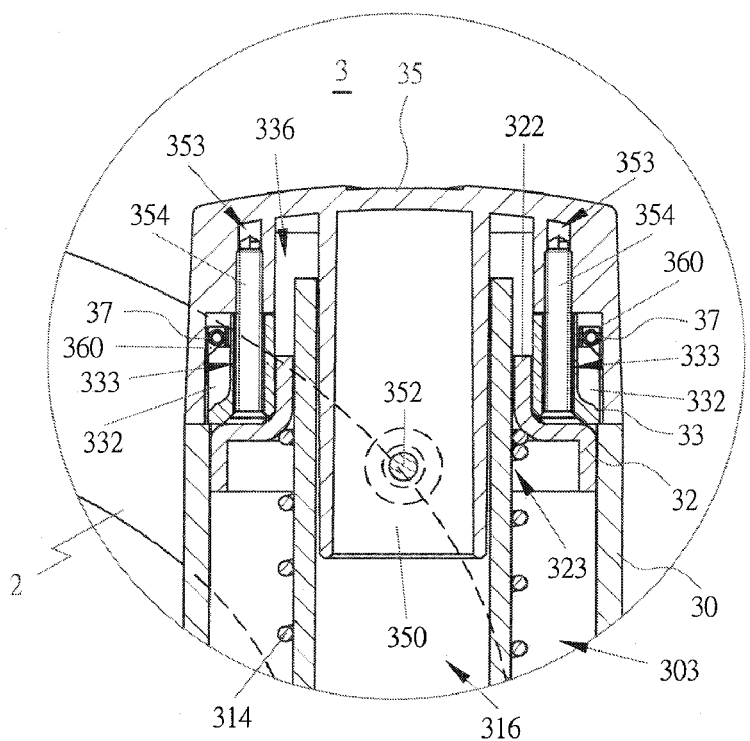
FIG. 8 is a partial magnified view of FIG. 7.

As shown in FIGS. 1 and 5~8, the cap 35 of the starting element of the adjustment device 3 is provided with a central circumferential wall 350 formed centrally in the interior to be fitted in the central hole 316 of the tube 313 of the movable member 31. Bored in the central circumferential wall 350 is a bolt hole 351 corresponding to the rivet hole 315 of the tubular member 313 and for being inserted by the rivet 352, so as to keep the cap 35 combined with the movable member 31. A bolt hole 353 is vertically bored in two sidewalls of the cap 35 respectively to correspond to the bolt hole 333 of the base, so that a bolt 354 can be inserted upward through the bolt hole 333 and the bolt hole 353 to keep the base 33 combined with the cap 35, as shown in FIG. 8. In addition, the cap 35 has a vertical circumferential wall 355 having two sides respectively formed with a groove 356 to work with the button 36.

As shown in FIGS. 1 and 5~8, the button 36 of the starting element of the adjustment device 3 is provided with two curved extending portions 360 and a pressing portion 361. The curved extending portions 360 is positioned inside the cap 35 to contact with the inner wall of the vertical circumferential wall 355, keeping the pressing portion 361 protruded outward through the groove 356 of the cap 35. The flexible fastener 34 is clamped by the button 36 and the cap 35. Laid on the upward projections 332 located at the front wall and the rear wall of the lower sideward-extending portion 330 of the base 33 respectively is a compression spring 37, which has two ends leaning against the corresponding free ends of the curved extending portions 360 of the buttons 36, so as to restore the buttons 36.

In operation, FIGS. 2~5 show that the swaying frame 2 is swung to stay vertical with the main frame 1 for keeping with a bicycle or the like after unfolding the bicycle carrier rack. By the time, the front wall 310 and the rear wall 310 of the movable member 31 are combined with those of the positioning member 20 of the swaying frame 2 to mainly make the swaying frame 2 stably combined with the main frame 1, with the positioning projection 21 engaged with the front positioning hole 130 of the main frame 1 to form a temporary engagement, as shown in FIGS. 7~11. As the adjustment device 3 is completely combined with the main frame 1, the main frame 1 and the swaying frame 2 are therefore unfolded stably.

When the bicycle carrier rack is to be folded up, a user just needs to press the buttons 36 of the starting element, so as to make the flexible fasteners 34 pressed as well. The starting element can thus be pulled up to temporarily move off the shell 30, with the front wall 310 and the rear wall 310 of the movable member 31 temporarily separated from those of the positioning member 20 of the swaying frame 2. By the time, the swaying frame 2 can be pushed down until the positioning projection 21 is engaged with the rear positioning hole 130 of the main frame 1 to form a temporary engagement, as shown in FIGS. 11 and 12. The starting element is to successively drop down automatically to enable the front wall and the rear wall 310 of the movable member 31 combined with those of the positioning member 20 of the swaying frame 2 again. So the main frame 1 and the swaying frame 2 are folded stably.

While the preferred embodiment of the invention has been described above, it will be recognized and understood that various modifications may be made therein and the appended claims are intended to cover all such modifications that may fall within the spirit and scope of the invention.

What is claimed is:

1. A bicycle carrier rack at least comprising:
   a main frame combined with a swaying frame by means of an adjustment device and provided with a central hole and two positioning holes;
   said swaying frame provided with a positioning member to be laid on said central hole of said main frame, a positioning projection protruded out of one side of said positioning member and engaging with said positioning hole of said main frame to achieve a primary positioning stage; and
   said adjustment device provided with a shell, a movable member installed in said shell and having a front wall and a rear wall, a space defined between said front wall and said rear wall, an initiating element utilized to alter combined status of said movable member and said swaying frame so as to keep said main frame and said swaying frame unfolded or folded.

2. The bicycle carrier rack as claimed in claim 1, wherein said main frame is provided with a positioning rack located at a bottom to fix on a vehicle or the like.

3. The bicycle carrier rack as claimed in claim 1, wherein said main frame has two sidewalls respectively cut with a recess at a top for said swaying frame to mount on.

4. The bicycle carrier rack as claimed in claim 1, wherein said main frame has a front wall and a rear wall respectively bored with said positioning hole.

5. The bicycle carrier rack as claimed in claim 1, wherein said swaying frame is shaped to match with said central hole of said main frame.

6. The bicycle carrier rack as claimed in claim 1, wherein said shell of said adjustment device is provided with a central hole and two sidewalls respectively having an arched groove to fit said swaying frame and wrap up said positioning member of said swaying frame.

7. The bicycle carrier rack as claimed in claim 6, wherein said central hole of said shell is installed with a sealing member upwards supported by a compression spring, said sealing member having a lower sideward-extending portion bored with a side hole in two corresponding sides respectively and an upper upward-extending portion with a central hole.

8. The bicycle carrier rack as claimed in claim 1, wherein said space formed between said front wall and said rear wall of said movable member is provided to accommodate said positioning member of said swaying device, and said front wall and said rear wall of said movable member can be moved to combine with those of said positioning member of said swaying device.

9. The bicycle carrier rack as claimed in claim 8, wherein said front wall and said rear wall of said movable member respectively have a notch employed for said positioning projection of said positioning member of said swaying member 2 to work freely.

10. The bicycle carrier rack as claimed in claim 1, wherein said movable member further has an upper portion formed with a tube wrapped by a compression spring, a rivet hole to be inserted by a rivet to joint a cap of an initiating element, and a central hole.

11. The bicycle carrier rack as claimed in claim 1, wherein said initiating element of said adjustment device includes a base provided with a lower sideward-extending portion having a groove formed in two sidewalls respectively and two upward projections formed at a front wall and a rear wall respectively, a bolt hole bored between said upward projections, said base further provided with an upper upward-extending portion having a recess formed at two sides of respectively and a central hole.

12. The bicycle carrier rack as claimed in claim 1, wherein said starting element of said adjustment device further includes two flexible fasteners respectively having an engaging groove used to fix with said recess of said base, said flexible fastener further having a downward extending portion and a projected portion formed at a bottom of said downward extending portion, said downward extending portion to be fitted in said groove of said base and inserted through said side hole of said sealing member so as to enable said projected portion to lean against an inner bottom of said lower sideward-extending portion of said sealing member.

13. The bicycle carrier rack as claimed in claim 1, wherein said starting element of said adjustment device further includes a cap provided with a central circumferential wall to be fitted in said central hole of said tube of said movable member, said central circumferential wall bored with a bolt hole corresponding to said rivet hole of said tube for being inserted by a rivet so as to keep said cap combined with said movable member.

14. The bicycle carrier rack as claimed in claim 13, wherein said cap is further provided with a bolt hole vertically bored in two sidewalls respectively to correspond to said bolt hole of said base, so that a bolt can be inserted upward through said bolt hole of said base into said bolt hole of said cap.

15. The bicycle carrier rack as claimed in claim 14, wherein said cap further includes a vertical circumferential wall having two sides respectively formed with a groove to work with a button.

16. The bicycle carrier rack as claimed in claim 1, wherein said starting element of said adjustment device further includes two buttons respectively provided with two curved extending portions and a pressing portion, with said curved extending portions positioned inside said cap to contact with an inner wall of said vertical circumferential wall of said cap to keep said pressing portion protruded outward through said groove of said cap.

\* \* \* \* \*